(12) United States Patent
Royzen

(10) Patent No.: US 8,246,326 B2
(45) Date of Patent: Aug. 21, 2012

(54) MECHANISM FOR SEALING PFA SEAL BAGS

(75) Inventor: Arcady Royzen, Norman, OK (US)

(73) Assignee: GE Oil & Gas ESP, Inc., Oklahoma City, OK (US)

( * ) Notice: Subject to any disclaimer, the term of this patent is extended or adjusted under 35 U.S.C. 154(b) by 14 days.

(21) Appl. No.: 12/770,338

(22) Filed: Apr. 29, 2010

(65) Prior Publication Data

US 2011/0194956 A1   Aug. 11, 2011

Related U.S. Application Data

(63) Continuation-in-part of application No. 12/151,328, filed on May 5, 2008.

(60) Provisional application No. 61/001,866, filed on Nov. 6, 2007.

(51) Int. Cl.
    *F04B 35/04* (2006.01)
(52) U.S. Cl. ..................... 417/414; 417/423.3
(58) Field of Classification Search ........... 417/414, 417/423.3, 423.8; 166/105, 106, 107, 187; 277/322, 366
See application file for complete search history.

(56) References Cited

U.S. PATENT DOCUMENTS

| | | | |
|---|---|---|---|
| 9,466 A | 12/1852 | Polley | |
| 1,402,504 A | 1/1922 | Krause | |
| 2,301,340 A | 11/1942 | Spengler | |
| 2,342,884 A | 2/1944 | Moore | |
| 2,569,741 A * | 10/1951 | Arutunoff | 310/87 |
| 3,103,235 A | 9/1963 | Stringham, III | |
| 3,116,432 A | 12/1963 | Ekey | |
| 3,167,209 A | 1/1965 | Jones | |
| 3,173,486 A | 3/1965 | Smith | |
| 3,209,785 A | 10/1965 | Mercier | |
| 3,337,222 A | 8/1967 | Smith, V et al. | |
| 3,514,113 A | 5/1970 | Weiswurm | |
| 3,571,636 A | 3/1971 | Carle et al. | |
| 3,654,964 A | 4/1972 | Mercier et al. | |
| 3,744,527 A | 7/1973 | Mercier | |
| 3,945,436 A | 3/1976 | Nebolsine | |
| 5,114,054 A | 5/1992 | Watson | |
| 5,367,214 A | 11/1994 | Turner, Jr. | |
| 5,505,327 A | 4/1996 | Witt | |
| 5,746,112 A | 5/1998 | Watson | |
| 6,058,532 A | 5/2000 | Allen | |
| 6,100,616 A | 8/2000 | Heinig et al. | |
| 6,305,753 B1 | 10/2001 | Rodrigues | |
| 6,537,628 B1 * | 3/2003 | Bruewer et al. | 428/36.4 |
| 7,159,508 B1 | 1/2007 | Birsner | |
| 7,708,534 B2 * | 5/2010 | Parmeter et al. | 417/423.3 |

\* cited by examiner

*Primary Examiner* — Charles Freay

(74) *Attorney, Agent, or Firm* — Crowe & Dunlevy

(57) ABSTRACT

A seal section for use in a downhole submersible pumping system includes a housing, a bag support tube extending through the housing, a shaft positioned inside the bag support tube and a bag plate connected to the bag support tube. The bag plate preferably includes an end cap secured to the bag support tube and a locking collar threadingly engaged with the end cap. The bag plate is configured to receive the open end of a cylindrical seal bag manufactured from perflouroalkoxy polymer. The end cap includes a tapered head that tapers from a first diameter that is slightly larger than the inner diameter of the seal bag to a second diameter that is slightly smaller than the inner diameter of the seal bag. This mechanism for securing the seal bag obviates the need for o-ring or other mechanical seals between the seal bag and the bag plate.

19 Claims, 4 Drawing Sheets

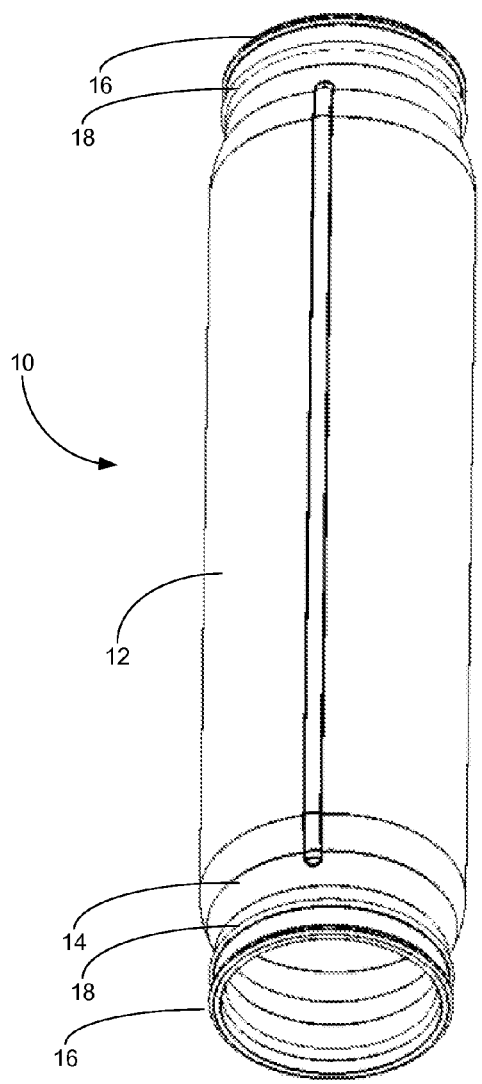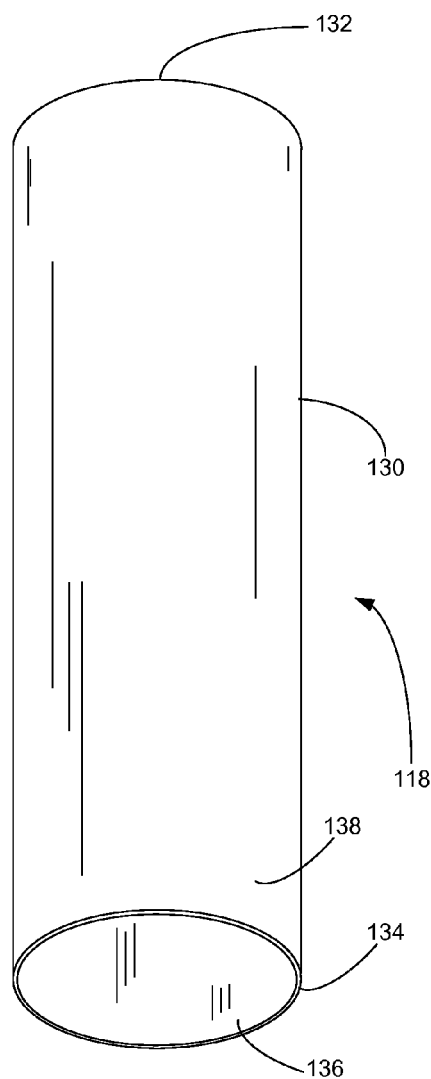
**PRIOR ART
FIG. 1**
FIG. 4

MECHANISM FOR SEALING PFA SEAL BAGS

RELATED APPLICATIONS

The present application is a continuation-in-part of U.S. patent application Ser. No. 12/151,328, filed May 5, 2008, entitled "Modular Seal Bladder for High Temperature Applications, which claims the benefit of U.S. Provisional Patent Application Ser. No. 61/001,866, filed Nov. 6, 2007."

FIELD OF THE INVENTION

This invention relates generally to the field of submersible pumping systems, and more particularly, but not by way of limitation, to a seal section separation bag for use with a submersible pumping system.

BACKGROUND

Submersible pumping systems are often deployed into wells to recover petroleum fluids from subterranean reservoirs. Typically, the submersible pumping system includes a number of components, including one or more fluid filled electric motors coupled to one or more high performance pumps. Each of the components and sub-components in a submersible pumping system must be engineered to withstand the inhospitable downhole environment, which includes wide ranges of temperature, pressure and corrosive well fluids.

Components commonly referred to as "seal sections" protect the electric motors and are typically positioned between the motor and the pump. In this position, the seal section provides several functions, including transmitting torque between the motor and pump, restricting the flow of wellbore fluids into the motor, protecting the motor from axial thrust imparted by the pump, and accommodating the expansion and contraction of motor lubricant as the motor moves through thermal cycles during operation. Many seal sections employ seal bags to accommodate the volumetric changes and movement of fluid in the seal section. Seal bags can also be configured to provide a positive barrier between clean lubricant and contaminated wellbore fluid.

In the past, seal bags have been constructed by sliding an open-ended bag over cylindrical mounting blocks. As shown in the Prior Art drawing in FIG. 1, a prior art seal bag 10 includes a central portion 12 and two neck portions 14. The prior art seal bag 10 is installed over cylindrical mounting blocks 16 by fastening the open neck portions 14 to the cylindrical mounting blocks 16 with common hose clamps 18. This prior art design may be unsuitable in certain applications because the hose clamps 18 tend to shear the prior art seal bag 10 after repeated or extensive expansion. Furthermore, the necessity of the neck portions 14 in the prior art seal bag 10 decreases the available length and volume of the central portion 12.

As the use of downhole pumping systems extends to new applications, traditional bladder systems may fail under inhospitable downhole environments. For example, the use of downhole pumping systems in combination with steam assisted gravity drainage (SAGD) technology exposes bladder components to temperatures in excess of 500° F. To increase the resistance of the bladder to degradation under these increasingly hostile environments, manufacturers have employed durable polymers, including various forms of polytetrafluoroethylene (PTFE), as the preferred material of construction. Although PTFE is generally resistant to the harsh downhole environment, the use of PTFE as a material of construction is discouraged by the need to create the bladder with a seam-type design that frustrates efforts to provide an effective seal. There is, therefore, a need for an improved seal bag, seal sections and submersible pumping systems that overcome the deficiencies of the prior art. It is to this and other needs that the present invention is directed.

SUMMARY OF THE INVENTION

In a preferred embodiment, a seal section for use in a downhole submersible pumping system includes a housing, a bag support tube extending through the housing, a shaft positioned inside the bag support tube and a bag plate connected to the bag support tube. The bag plate preferably includes an end cap secured to the bag support tube and a locking collar threadingly engaged with the end cap. A seal bag that is substantially cylindrical and includes an open end that is captured between the end cap and the locking collar.

In the preferred embodiments, the end cap includes a tapered head that tapers from a first diameter that is slightly larger than the inner diameter of the seal bag to a second diameter that is slightly smaller than the inner diameter of the seal bag. The seal bag is preferably manufactured from perfluoroalkoxy polymer and provided with sufficient elasticity to permit the stretched placement of the seal bag over the tapered head of the end cap. This mechanism for securing the seal bag onto the bag plate reduces the dependency on narrow manufacturing tolerances and obviates the need for o-ring or other mechanical seals between the seal bag and the bag plate.

BRIEF DESCRIPTION OF THE DRAWINGS

FIG. 1 is a side perspective view of a PRIOR ART seal bag.

FIG. 4 is a side perspective view of the seal bag of FIG. 3.

DETAILED DESCRIPTION OF THE PREFERRED EMBODIMENTS

Figure 2:
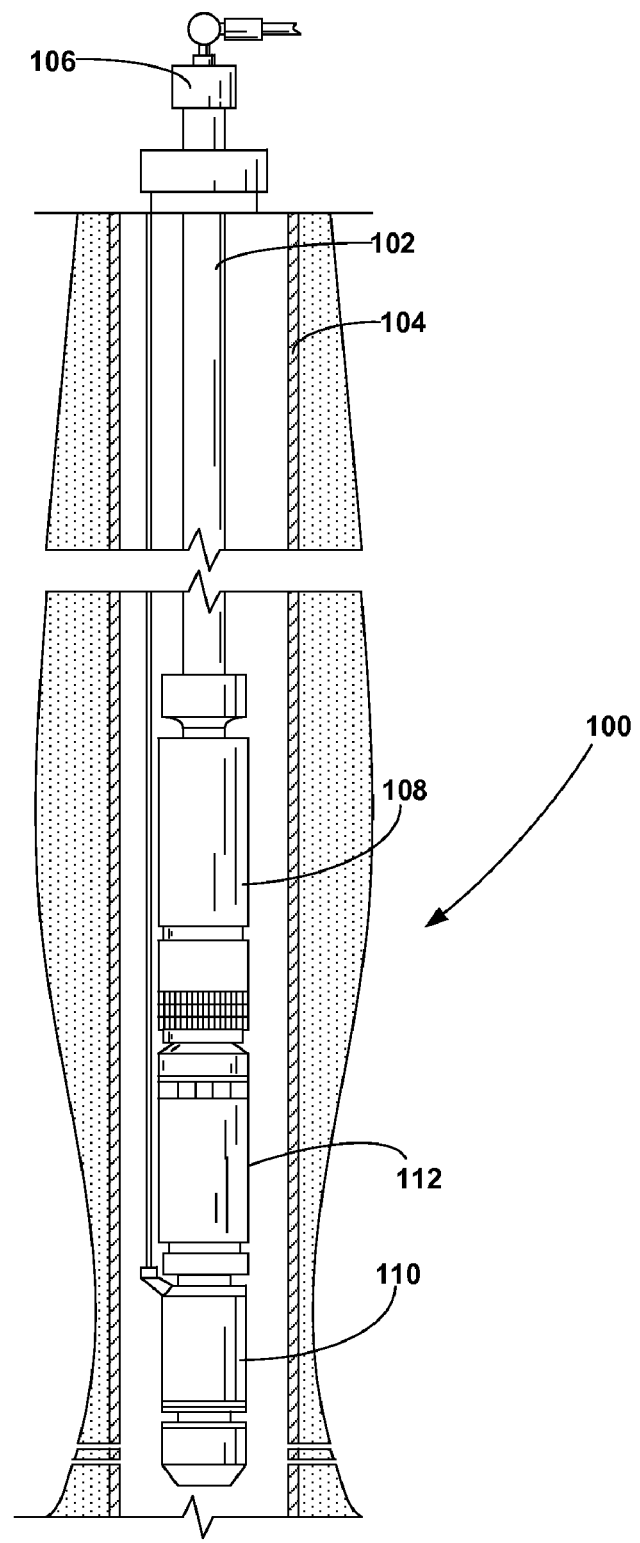
FIG. 2 is an elevational view of a submersible pumping system constructed in accordance with a presently preferred embodiment.

In accordance with a preferred embodiment of the present invention, FIG. 2 shows an elevational view of a pumping system 100 attached to production tubing 102. The pumping system 100 and production tubing 102 are disposed in a wellbore 104, which is drilled for the production of a fluid such as water or petroleum. As used herein, the term "petroleum" refers broadly to all mineral hydrocarbons, such as crude oil, gas and combinations of oil and gas. The production tubing 102 connects the pumping system 100 to a wellhead 106 located on the surface. Although the pumping system 100 is primarily designed to pump petroleum products, it will be understood that the present invention can also be used to move other fluids. It will also be understood that, although each of the components of the pumping system are primarily disclosed in a submersible application, some or all of these components can also be used in surface pumping operations.

The pumping system 100 preferably includes some combination of a pump assembly 108, a motor assembly 110 and a seal section 112. The motor assembly 110 is preferably an electrical motor that receives power from a surface-mounted motor control unit (not shown). When energized, the motor assembly 110 drives a shaft that causes the pump assembly 108 to operate. The seal section 112 shields the motor assembly 110 from mechanical thrust produced by the pump assembly 108 and provides for the expansion of motor lubricants during operation. The seal section 112 also isolates the motor assembly 110 from the wellbore fluids passing through the pump assembly 108. Although only one of each component is shown, it will be understood that more can be connected when appropriate. It may be desirable to use tandem-motor combinations, multiple seal sections, multiple pump assemblies or other downhole components not shown in FIG. 2.

Figure 3:
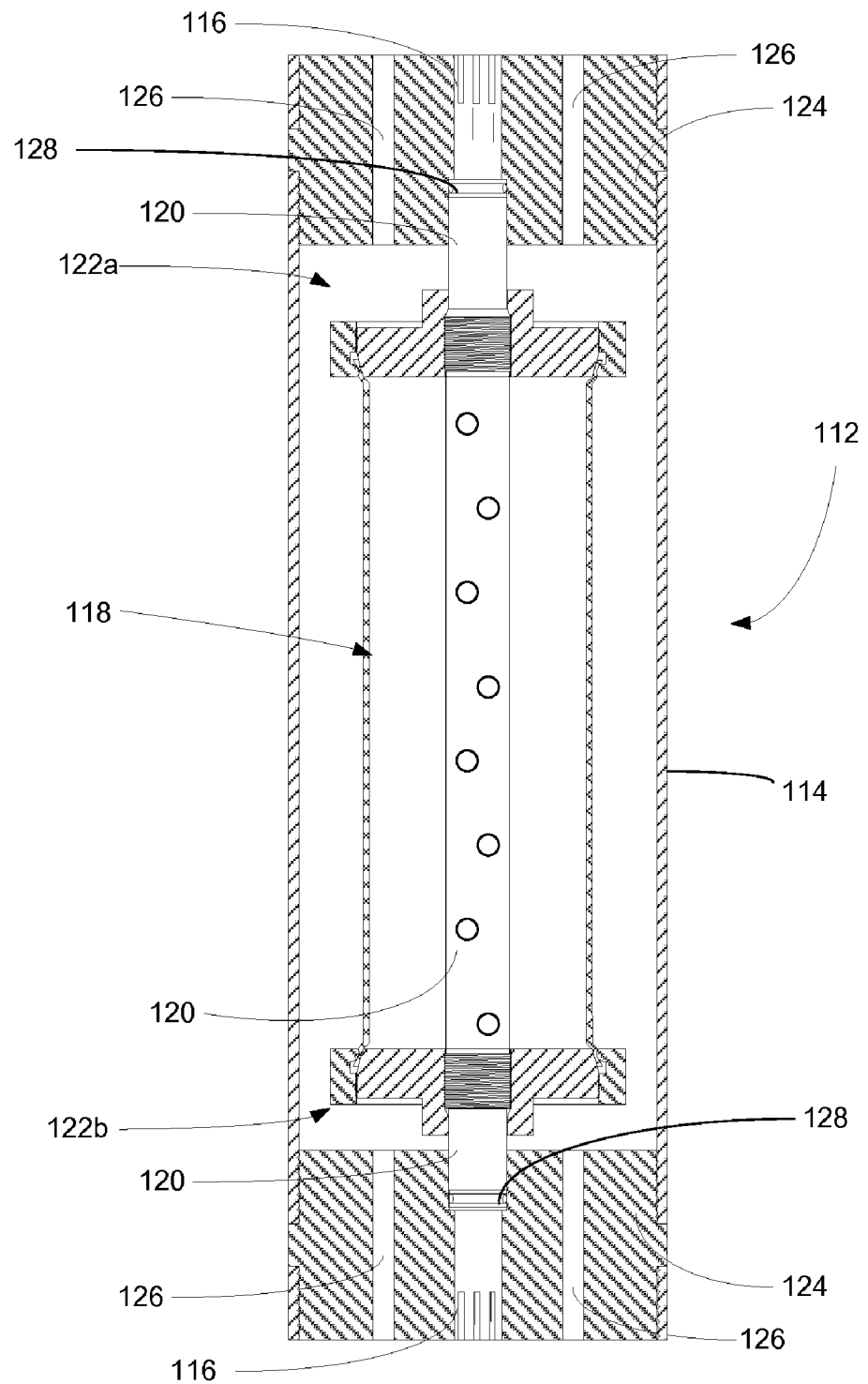
FIG. 3 is a cross-sectional view of a first preferred embodiment of a seal section for use with the submersible pumping system of FIG. 2.

Referring now to FIG. 3, shown therein is a cross-sectional view of the seal section 112. The seal section 112 includes a housing 114, a shaft 116, a seal bag 118, a support tube 120 and first and second bag plates 122a, 122b. The seal bag 118 is configured to prevent the contamination of clean motor lubricants with wellbore fluids. The shaft 116 transfers mechanical energy from the motor assembly 110 to the pump assembly 108. The bag support tube 120 provides support for the seal bag 118 and shields the shaft 116 as its passes through the seal bag 118. For the purposes of the instant disclosure, the terms "bag seal assembly" will refer to the seal bag 118, the bag support tube 120 and the first and second bag plates 122a, 122b. In addition to the bag seal assembly, the seal section 112 may also include seal guides 124, a plurality of ports 126 and one or more o-ring seals 128. The o-ring seals 128 are located at various positions within the seal section 112 and limit the migration of fluid along the shaft 116.

For purposes of illustration, the bag seal assembly is disclosed as contained within the seal section 112. It will be understood, however, that the bag seal assembly could be installed elsewhere in the pumping system 100. For example, it may be desirable to integrate the bag seal assembly within the motor assembly 110 or pump assembly 108.

Referring now also to FIG. 4, shown therein is a side perspective view of a preferred embodiment of the seal bag 118. The seal bag 118 preferably includes a central portion 130, a first end 132 and a second end 134. The seal bag 118 is substantially configured as an elongated cylinder with an inner surface 136 and an outer surface 138. By comparing FIGS. 1 and 4, it can be seen that the seal bag 118 provides a larger internal capacity. This increased capacity is largely due to the configuration of the seal bag 118, which does not include the neck portions 14 that were used to secure the prior art seal bag 10 to the mounting blocks 16.

In the preferred embodiment, the seal bag 118 is fabricated from a perflouroalkoxy (PFA) flouropolymer, which is commercially available from a number of sources, including E.I. du Pont de Nemours and Company and Daikin Industries. Like PTFE, PFA exhibits favorable resistance to corrosive chemicals and elevated temperatures. Unlike PTFE, however, PFA is melt-processable using conventional injection molding and screw extrusion mechanisms. The ability to extrude or mold PFA permits the construction of a seamless, unitary seal bag 118. Thus, as an advance over the prior art, the seal bag 118 is a seamless bag that is fabricated using injection molding or extrusion techniques.

Figure 5:
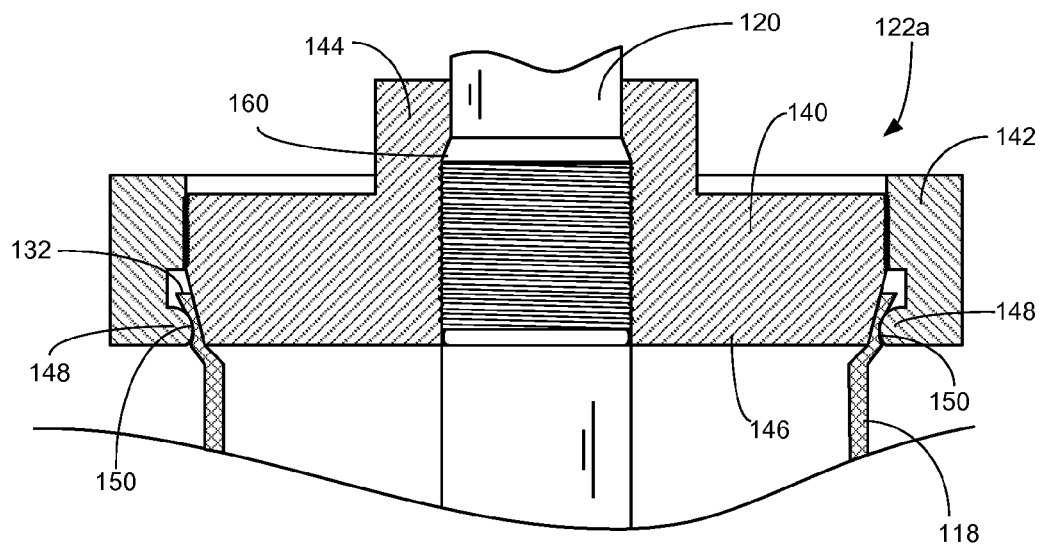
FIG. 5 is a side cross-sectional view of the first preferred embodiment of the bag plate of the seal section of FIG. 3.
Figure 6:
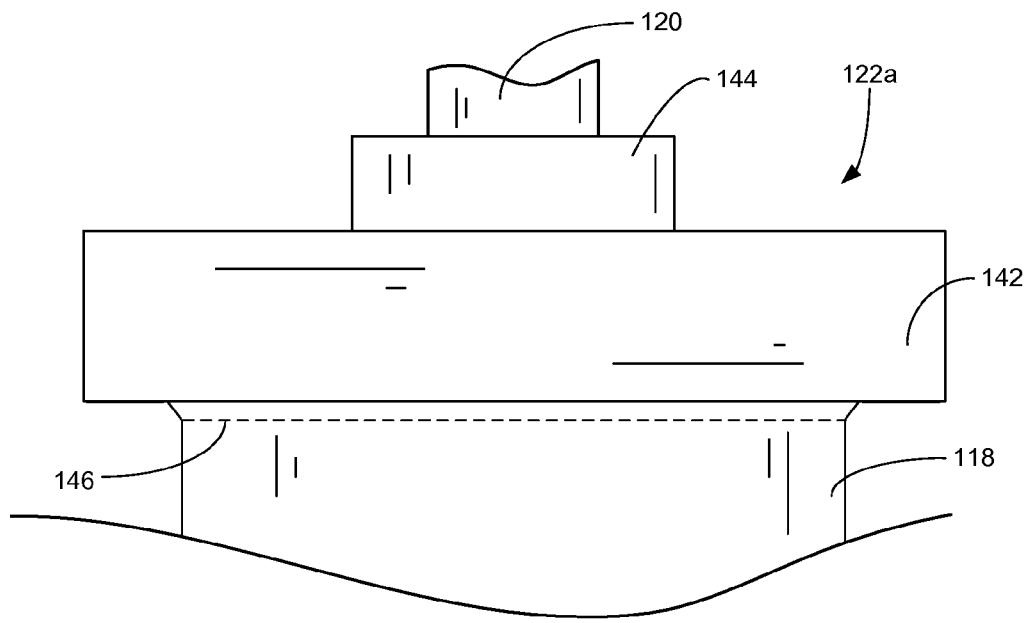
FIG. 6 is a view of the bag plate of FIG. 5.

Turning now to FIGS. 5 and 6, shown therein is a close-up, partial cross-sectional and cut-away view of the engagement between the seal bag 118, the support tube 120 and bag plate 122a. Although only bag plate 122a is shown in FIGS. 5 and 6, it will be appreciated that bag plate 122b makes use of the same components on the opposite end of the seal bag 118 (as shown in FIG. 3). Unless otherwise specified, the various components within the bag plates 122a, 122b of the preferred embodiments in FIGS. 5 and 6 are the same.

In the presently preferred embodiments, the bag plate 122a includes an end cap 140 and a locking collar 142. The end cap 140 preferably includes a stem 144 and a tapered head 146. In a preferred embodiment, the end cap threadingly engaged with the bag support tube 120. Alternatively, the end cap 140 can be configured to rest on a shoulder 160 formed on the bag support tube 120. The preferred embodiment illustrated in FIG. 5 illustrates both forms of engagement between the end cap 140 and the bag support tube 120.

The head 146 of the end cap 140 is preferably tapered from a first outer diameter slightly larger than the inner diameter of the seal bag 118 to a second outer diameter that is slightly less than the inner diameter of the seal bag 118. In this way, the first end 132 of the seal bag 118 can be pushed onto the head 146 of the end cap 140. The elasticity of the PFA material allows the seal bag 118 to stretch to conform to the shape of the head 146 of the end cap 140. The engagement between the seal bag 118 and the head 146 is superior to prior methods of securing seal bags because the elastic nature of the seal bag 118 reduces the dependency on tight manufacturing tolerances otherwise required between sealing surfaces. Accordingly, the ability of the seal bag 118 to conform to the contour of the head 146 of the end cap 140 reduces the risk of a seal failure and obviates the need for o-rings or other mechanical seals found in prior designs.

The seal bag 118 is held in place over the head 146 by the locking collar 142, which applies a compressive force on the end portion 132 of the seal bag 118. The locking collar 142 includes a contact ring 148 that includes a tapered interior surface 150. The tapered interior surface 150 is preferably oriented at a different angle than the tapered surface of the head 146. The different angles ensure that an area of contact or pressure point will be present between the tapered interior contact surface 150 and tapered head 146. The compressive force of the locking collar 142 further improves the sealed engagement between the seal bag 118 and the end cap 140. The locking collar 142 is preferably configured for threaded engagement over the outside of the end cap 140.

In a preferred method of installation, the end cap 140 of one of the bag plates 122 is secured to bag support tube 120. The seal bag 118 is then inserted over the bag support tube 120 and stretched onto the tapered head 146 of the end cap 140. Next, locking collar 142 is extended over the free end of the seal bag 118 and moved into position adjacent end cap 140. The locking collar 142 is then rotated into threaded engagement with the end cap 140 until the tapered interior surface 150 of the contract ring 148 applies sufficient compression to the seal bag 118. Due to the linear movement of the locking collar 142 as it is threaded onto end cap 140, the compression exerted between the offset angled tapered head 146 and the tapered interior contact surface 150 can be controlled by adjusting the extent of engagement between the locking collar 142 and end cap 140. The installation of the seal bag 118 to the second bag plate 122 is accomplished in the same manner, except that the second locking collar 142 must be temporarily positioned over the seal bag 118 before it is attached to the end cap 140 of the second bag plate 122.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

What is claimed is:

1. A seal section for use in a downhole submersible pumping system, the seal section comprising:
    a housing;
    a bag support tube extending through the housing;
    a shaft positioned inside the bag support tube;
    a bag plate connected to the bag support tube, wherein the bag plate includes:
        an end cap secured to the bag support tube, wherein the end cap includes a tapered head; and
        a locking collar having radially inner threads and being threadingly engaged with the end cap, wherein the locking collar includes a contact ring; and
    a seal bag, wherein the seal bag is substantially cylindrical, seamless and includes an open end that is captured between the tapered head of the end cap and the contact ring of the locking collar.

2. The seal section of claim 1, wherein the tapered head tapers from a first diameter that is slightly larger than an inner diameter of the seal bag to a second diameter that is slightly smaller than the inner diameter of the seal bag.

3. The seal section of claim 2, wherein the seal bag is seamless and fabricated from an extruded fluoropolymer.

4. The seal section of claim 3, wherein the seal bag is fabricated from perfluoroalkoxy polymer.

5. The seal section of claim 1, wherein the tapered interior surface of the locking collar is tapered at a different angle than the taper on the tapered head of the end cap.

6. The seal section of claim 5, wherein the locking collar and end cap each include mating threads that permit the threaded engagement between the locking collar and end cap.

7. The seal section of claim 6, wherein the bag plate does not include an o-ring seal on the tapered head of the end cap.

8. A downhole pumping system comprising:
    a motor;
    a pump driven by the motor; and
    a seal section positioned between the pump and the motor, wherein the seal section includes:
        a housing;
        a bag support tube extending through the housing;
        a shaft positioned inside the bag support tube;
        a first bag plate connected to the bag support tube, wherein the first bag plate includes:
        an end cap secured to the bag support tube; and
        a locking collar having radially inner threads and being threadingly engaged with the end cap; and
        a seal bag, wherein the seal bag has a substantially constant diameter along its entire length and includes a first end that is captured between the end cap and the locking collar.

9. The downhole pumping system of claim 8, wherein the end cap includes a tapered head that tapers from a first diameter that is slightly larger than an inner diameter of the seal bag to a second diameter that is slightly smaller than the inner diameter of the seal bag.

10. The downhole pumping system of claim 9, wherein the seal bag is seamless and fabricated from an extruded fluoropolymer.

11. The downhole pumping system of claim 10, wherein the seal bag is fabricated from perfluoroalkoxy polymer.

12. The downhole pumping system of claim 8, wherein the locking collar includes a contact ring and a tapered interior surface.

13. The downhole pumping system of claim 12, wherein the tapered interior surface of the locking collar is tapered at a different angle than the taper on the tapered head of the end cap.

14. The downhole pumping system of claim 13, wherein the locking collar and end cap each include mating threads that permit the threaded engagement between the locking collar and end cap.

15. The seal section of claim 14, wherein the bag plate does not include an o-ring seal on the tapered head of the end cap.

16. A seal section for use in a downhole submersible pumping system, the seal section comprising:
    a housing;
    a bag support tube extending through the housing;
    a shaft positioned inside the bag support tube;
    a first bag plate connected to the bag support tube, wherein the first bag plate includes:
        a first end cap secured to the bag support tube; and
        a first locking collar having radially inner threads and being threadingly engaged with the first end cap;
    a second bag plate connected to the bag support tube, wherein the second bag plate includes:
        a second end cap secured to the bag support tube; and
        a second locking collar threadingly engaged with the second end cap; and
    a seal bag, wherein the seal bag comprises a seamless perfluoroalkoxy polymer tube having a substantially constant diameter along its length with a first end stretched over the first end cap and a second end stretched over the second end cap.

17. The seal section of claim 16, wherein the first end of the seal bag is secured to the first end cap with the first locking collar and the second end of the seal bag is secured to the second end cap with the second locking collar.

18. The seal section of claim 16, wherein the first bag plate does not include an o-ring seal disposed on the first end cap.

19. The seal section of claim 16, wherein the second bag plate does not include an o-ring seal disposed on the second end cap.

* * * * *